US006589119B1

(12) United States Patent
Orus et al.

(10) Patent No.: US 6,589,119 B1
(45) Date of Patent: Jul. 8, 2003

(54) DATA AND VALUE UNIT TRANSFER SYSTEM ON SLOT MACHINE NETWORK

(75) Inventors: Herve Orus, Camoux en Provence (FR); Jean-Jacques Foglino, Peynier (FR)

(73) Assignee: Gemplus, Gemenos (FR)

( * ) Notice: Subject to any disclaimer, the term of this patent is extended or adjusted under 35 U.S.C. 154(b) by 0 days.

(21) Appl. No.: 09/202,426

(22) PCT Filed: Mar. 20, 1998

(86) PCT No.: PCT/FR98/00583

§ 371 (c)(1), (2), (4) Date: Feb. 19, 1999

(87) PCT Pub. No.: WO98/47114

PCT Pub. Date: Oct. 22, 1998

(30) Foreign Application Priority Data

Apr. 11, 1997 (FR) .......................................... 97 04734

(51) Int. Cl.[7] .......................... G06F 17/00; H04L 12/50

(52) U.S. Cl. .......................................... 463/42; 370/360

(58) Field of Search ............................ 463/16, 20, 25, 463/29, 39, 40–43, 47, 46; 235/380–382, 382.5; 273/143 R; 902/23, 25–29; 370/230, 231, 282, 329, 341, 299, 360, 355, 433, 465–467

(56) References Cited

U.S. PATENT DOCUMENTS

| | | | | |
|---|---|---|---|---|
| 4,964,638 A | * 10/1990 | Ishida | ......................... | 463/27 |
| 5,179,517 A | * 1/1993 | Sarbin et al. | ................. | 463/25 |
| 5,371,345 A | * 12/1994 | LeStrange et al. | .......... | 235/380 |
| 5,429,361 A | * 7/1995 | Raven et al. | ................ | 463/25 |
| 5,470,079 A | 11/1995 | LeStrange | | |
| 5,919,091 A | * 7/1999 | Bell et al. | ..................... | 463/25 |

FOREIGN PATENT DOCUMENTS

| | | |
|---|---|---|
| EP | 0325455 | 1/1989 |
| EP | 0342797 | 11/1989 |
| EP | 0534718 | 3/1993 |
| FR | 2603401 | 4/1988 |

* cited by examiner

*Primary Examiner*—Kim Nguyen
(74) *Attorney, Agent, or Firm*—Roland Plottel

(57) ABSTRACT

A data transfer network with at least one slot machine (200) having a value unit transfer element (300) and a data transfer link (123) connected to a central processing unit (1). Between each slot machine and the transfer link is a device (400) that provides a multichannel link including a first main channel (410) connecting to the central processing unit (1) via the network data transfer link (123), a second main channel (420) connecting to the slot machine (200), and a secondary channel (430) connecting to the value unit transfer element (300). A data transfer switching and coordinating means enables data to be transmitted between the slot machine (200) and the value unit transfer element (300), and data to be transmitted between the slot machine (200) and the data transfer link (123).

22 Claims, 2 Drawing Sheets

DATA AND VALUE UNIT TRANSFER SYSTEM ON SLOT MACHINE NETWORK

BACKGROUND OF THE INVENTION

1. Field of the Invention

The present invention relates to the field of slot machines such as jackpot machines and other individual gambling machines of the type found in casinos.

2. Description of the Related Art

Slot machines that can receive or send electronic fund transfers corresponding to the bets or winnings of a gambler are known. These electronic transfers have the advantage that large sums of money need not be carried or handled.

Document EP-A-0,360,613 thus describes an electronic system for transferring value units between a slot machine and a chip card storing the value unit account of a gambler.

The document describes in particular a special slot machine including a transcriber that transcribes value units onto a chip card.

One drawback of such a slot machine including an electronic coin meter is that it cannot record and check transfers and gambling operations involving electronic money.

Secured systems that control a group of machines, in which the machines are networked with a central computer handling all the accounting information, are known. The machines receive the electronic fund transfers solely from the central computer.

However, the gamblers are no longer free to carry out their gambling operations in isolation, as the initial bets and the winnings are recorded in the central computer by an operator, usually a casino cashier.

One general drawback of these slot machine systems is that they cannot adapt to any type of payment means—bank cards, coins, bills, tokens, or centralized electronic transfers, depending on current trends or the preferences of the gamblers.

BRIEF SUMMARY OF THE INVENTION

One goal of the invention is to create a device for a network of slot machines that adapts to various methods of payment while allowing the gambling operations to be readily checked by a central processing unit.

Another goal of the invention is to create a device for a slot machine able to make electronic transfers for networking these machines with a central processing unit.

These goals are achieved according to the invention by a slot machine able to handle electronic transfers, an electronic coin meter transmitting electronic transfers, and the central processing unit supervising the monetary and data transfers being interconnected by a data transfer switching and coordination device, of the multiplexer type, that switches transfers of data or value units from the slot machine either to the electronic coin meter or to the central processing unit.

Electronic coin meters can thus be inserted into a network of slot machines with no modification in the data transfer network. In addition, the slot machines connectable individually to an electronic coin meter can thus be networked with a central processing unit.

Advantageously, the invention provides for alternating exchanges of data between the slot machine and the coin meter with exchanges of data between the slot machine and the central processing unit.

Various types of coin meters, hereinafter called value unit transfer elements, can also be connected to a machine, and the device translates the data transmission protocol used by the coin meter according to the protocol usable by the machine.

According to the invention, a device for transferring data is provided, intended for insertion into a network of slot machines provided with value unit transfer elements communicating via a data transfer link with a central processing unit, characterized in that the device has a multichannel link, a first channel being assigned to the network data transfer with the central processing unit, a second channel being assigned to a slot machine, a third channel being assigned to a value unit transfer element, and in that the device has means for switching data transfers enabling main data transmissions to be made between two main channels and enabling secondary data transmissions to be made between a main channel and a secondary channel.

Advantageously, means for coordinating data transfers place at least one channel on standby when a transmission is made between two other channels.

Advantageously, the coordination means allow main transmissions and secondary transmissions to be made simultaneously, the secondary transmissions being intercalated between the main transmissions.

The invention also provides for a data transfer network having at least one slot machine, at least one value unit transfer element, and a data transfer link communicating with a central processing unit, characterized by having means for switching and coordinating data transfers that enable data to be transmitted between the slot machine and the value unit transfer element and data to be transmitted between the slot machine and the network link.

Implementation of the invention will be better understood by reading the description and drawings hereinbelow, provided as nonlimiting examples; in the attached drawings:

DETAILED DESCRIPTION OF THE INVENTION

Figure 1:
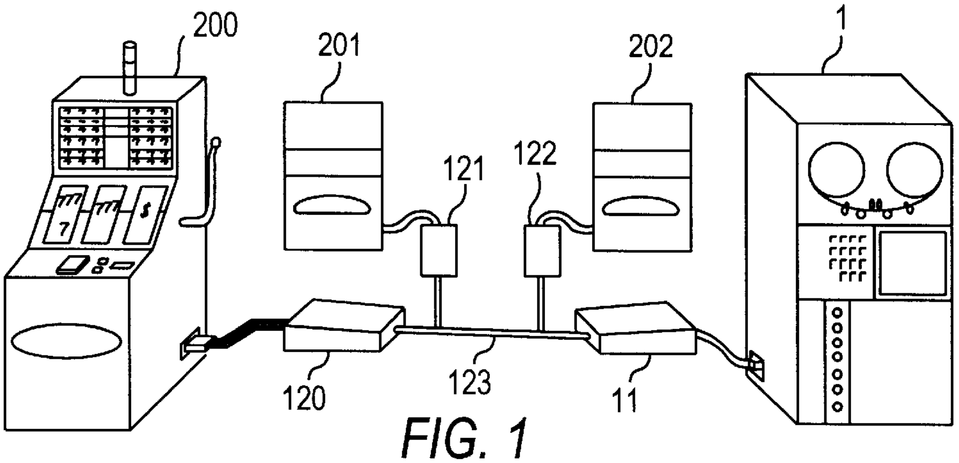
FIG. 1 PRIOR ART
FIG. 1 represents slot machines networked with a central computer according to the prior art.

A known example of networked gambling machines is illustrated in FIG. 1. Such networking allows the gambling operations carried out with slot machines 200, 201, and 202 to be recorded for the bookkeeping purposes of a casino for example or the regularity of the operations carried out to be monitored.

It is currently planned to develop slot machine networks outside casinos to extend the use of gambling machines to various locations such as private gambling rooms or bars, or develop domestic gambling machines.

The network enables data to be transmitted between a slot machine 200 and a central processing unit 1 in order to store information on the gambling operations. In particular, the bets and winnings of a gambler and the balance of his gambling operations can be transmitted. This data transmission can additionally include the transfer of value units between the network and the gambling machine, with central computer 1 controlling for example a value unit account of the gambler or distributing premiums to a regular gambler.

Such a network includes in particular slot machines 200, 201, 202 of a known type, connected by means 123 that link the network to a central computer 1, or any other centralized control system.

Network link means 123 can be any type of link that carries data, particularly digital data.

The transmission can be of any type: electrical, radio, or optical for example, using suitable connecting means such as cables, antennas, or optical fibers.

In general, the network link means 123 are connected to slot machines 200, 201, 202 and to computer 1 by adapters 120, 121, 122, and 11. Such devices adapt the transmission mode used over the network link to the data transmission mode used by the machine. The adapters can also serve as an interface for formatting data according to predefined data transfer protocols.

In the case of a local casino slot machine network, the link means are for example a serial link of the RS 485 type over a shielded cable or two-wire connection. The link can also be a parallel link to handle a larger amount of data.

In the case of a network extended to slot machines disposed in various public and private locales, the link can advantageously be a telephone link. Each gambling machine 200, 201, or 202 is in this case connected to the link means by a modulator-demodulator of the telephone modem type shown in FIG. 1 under reference 120, 121, or 122. Central computer 1 is in this case also connected by a telephone modem 11 to network link means 123.

The invention implements slot machines able to receive transfers of data corresponding to value units. A gambler can thus make electronic fund transfers to place bets or register winnings. Various transfer procedures are contemplated.

The value unit accounts can thus be handled by central unit 1, each gambler having a card of the magnetic card, chip card, or contactless card type to identify him and authorize operations on his account, crediting or debiting the slot machine.

With another procedure, each gambler has a chip card, of the telephone card type, storing value units for placing bets. Each machine is then provided with a transcriber transcribing data onto a chip card so that the value units debited and/or credited can be read and recorded. Information on the gambler such as his age and gambling patterns can also be stored in the card and transmitted by the transcriber. In one advantageous variant of this procedure, a bank card can be used to gamble with a slot machine, the machine being provided with a suitable bank card reader/validator.

Embodiments of value unit transfer elements are described in patent documents, particularly French Patent FR 96 10031 in the name of the applicant. These descriptions are incorporated herein by reference as embodiments.

Another advantageous procedure allows the gambler to gamble with bills, each machine having an apparatus that recognizes bills. The apparatus thus electronically transfers the corresponding sums to the slot machine before the gambler places his bets. Conversely, the slot machine can credit the apparatus so that the gambler collects his winnings in the form of bills.

In general, thus, the invention provides for each machine 200, 201, or 202 to be provided with a value unit transfer element 300, 301, or 302 which exchanges digital data messages corresponding to the sums of money involved or to other information.

Moreover, the invention calls for the gambling machines 200, 201, 202 provided with such value unit transfer elements to be connected in a network 123 with a central processing unit 1 to monitor the regularity of the gambling operations or create account or tax statements or carry out promotion activities such as awarding value units to a regular gambler.

Such a network 123 of slot machines 200, 201, and 202 connected to central processing unit 1 can thus serve to transfer data of all types, including data corresponding to value units.

It can thus be seen that various types of payment and winnings delivery means can be used according to the invention, such as chip cards, contactless cards, bank cards, coins, bills, or tokens, or value unit transfers. One need only provide an electronic coin meter, more generally called value unit transfer element, that can check the validity of the payment means and make the corresponding electronic value unit transfer to the slot machine.

Figure 2:
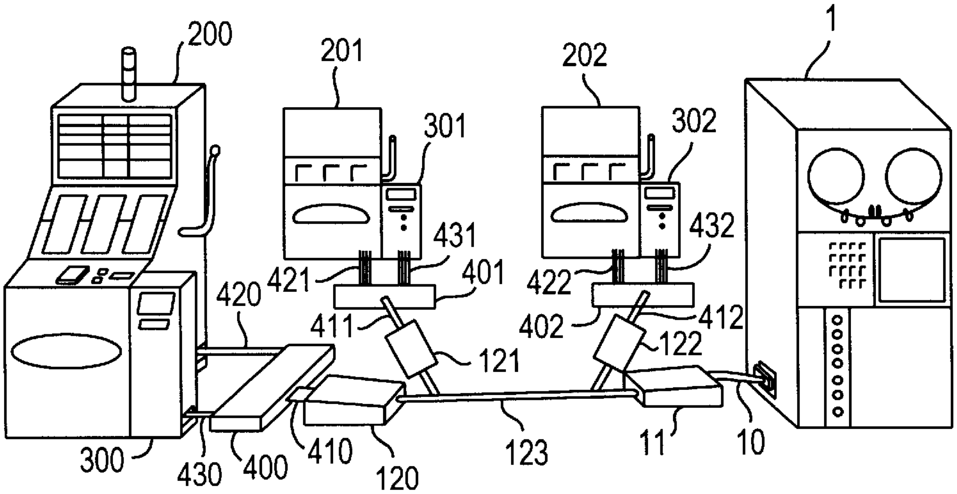
FIG. 2 represents a network of slot machines and data transcribers transcribing onto a chip card and connected to a central computer, with data transfer switching and coordination means according to the invention.

Machine 200, shown in FIG. 2, can of course be an electronic coin meter machine 300 exclusively, but also a double coin meter machine, namely a machine that has a coin or token meter in addition to this electronic coin meter 300 (FIG. 2).

In the case of a double coin meter machine, according to the invention the gambler has the option of gambling with coins or tokens and collecting his winnings solely in the form of coins.

According to the invention, switching means 400 are provided for transmitting data between the slot machine and the value unit transfer element, and transmitting data between the slot machine and the central processing unit over the network link means 123.

Such switching means 400 allow data transmissions from the slot machine or intended for the slot machine to be switched.

In a first state, switching means 400 thus enable slot machine 200 and value unit transfer element 300 to exchange data, particularly gambling value units.

For example, if transfer element 300 is a transcriber transcribing data onto a chip card, machine 200 can thus be informed of the value unit balance stored in the chip card and count the value units in the card. Conversely, when the gambler wins, machine 200 transfers the value unit winnings to transcriber 300 which records them on the chip card. Machine 200 and data transcriber 300 can also exchange information on the gambler,and this information can be stored in the card.

In a second state, switching means 400 enable slot machine 200 to receive and send data over network link means 123. The data can in particular come from or be routed to a central computer 1 connected to network 123. The data exchanges can be of any type, for example gambling value units if central unit 1 is handling the gambler's value account or if the central unit is awarding free games to regular gamblers in a customer loyalty application.

Thus, information on the gambler or information on the operations conducted with a given card or on a given machine can be transmitted so that an accounting statement or operations check can be made.

It is preferable for switching means 400 also to allow data to be transmitted directly between transfer element 300 and network link means 123, hence between value unit transfer element 300 and central processing unit 1.

As can be seen in FIG. 2, the invention is preferably implemented in the form of a device 400 containing switching means MUX, device 400 being connected to network link means 123, to a slot machine 200, and to a transfer element 300.

Also, switching means MUX can be disposed in slot machine 200 or in transfer element 300.

Such a switching device 400 or MUX preferably has a multichannel link with at least three input-output channels. A first channel 410, assigned to central computer 1, is connected by an adapter 120 to network link means 123.

A second channel 420, assigned to slot machine 200, is connected to this machine 200.

A third channel 430, assigned to transfer element 300, is connected to this transfer element 300.

According to the invention, switching means MUX of device 400 thus enable two of the aforesaid channels to communicate with each other.

Switching means MUX can be simply a multiplexer or demultiplexer device.

"Multiplexer" is understood to be an electronic circuit with one input channel and several output channels linking the input channel with one of the output channels according to an output selection signal. A multiplexer can in particular reformat the data present in the input channel to relay the transmission of data to the output channel.

Conversely, "demultiplexer" is understood to be an electronic circuit with several input channels and one output channel connecting one of the input channels with the output according to an input selection signal. A demultiplexer can in particular relay the data transmitted.

The data transfer device can be implemented simply from a "multiplexer/demultiplexer" electronic circuit with three channels of a known type. Various embodiments of such a circuit can be envisaged by the individual skilled in the art and will not be described in detail herein. We will simply explain the operation of such a simple multiplexing device.

Assume that data are to be transmitted between central unit 1 and machine 200. The beginning of the data message received via channel 410 of the central unit has a signal indicating the destination channel 420.

A corresponding signal, internal to the switching device, selects one of the two channels placed in communication, while another internal signal selects the other of the two channels placed in communication.

In this example, the first signal selects channel 410 and one multiplexer/demultiplexer of the transfer device. The second signal selects channel 420 and a second multiplexer/demultiplexer of the transfer device. The two channels 410 and 420 are thus interconnected.

The data can thus be transmitted from central unit 1 to machine 200 just as they can be transmitted from machine 200 to central unit 1.

In this case, it is preferable for third channel 430 to be disconnected. Neither of the first channels 410, 420 is then in communication with third channel 430.

This prevents interference with the transfer of data between the first two channels, or erroneous commencement of a communication protocol with third channel 430.

Preferably, it is the coordination means that place the channels on standby that are not in communication.

In our example, a standby signal can thus be sent via third channel 430 when the first two channels 410 and 420 are in communication.

When a message is to be transmitted via channel 430, transfer element 300 looks to see whether a standby signal is present in its channel 430. If there is no standby signal, i.e. if slot machine 200 is not in communication with network 123, transfer element 300 can send its message.

Assume for example that a gambler is carrying out a gambling operation on slot machine 200 with a chip card. Positioning himself in front of the machine, the gambler inserts his card into a data transcriber transcribing onto a chip card that plays the role of value unit transfer element 300. This transcriber reads data recorded in the chip card. The transcriber can also find out and store the value unit balance of the card corresponding to the sum of money available to the gambler. The transcriber can also check the validity of the chip card from digital card identification data, particularly its serial number and recognition keys or secret cryptography keys, by applying a calculation algorithm or a cryptography algorithm. Such well-known algorithms will not be described in detail herein.

Transcriber 300 can then transmit this information to slot machine 200, sending a message composed of a series of data on the value unit balance read from the chip card.

The transcriber begins its message by signaling the message recipient element, and the switching means, recognizing the recipient, place channels 430 and 420 corresponding to the message sender and recipient in communication, thus linking transcriber 300 to slot machine 200. Once machine 200 receives the message, it can return a reception signal to the transcriber.

The switching means can keep the two channels 420 and 430 in communication as long as a dialog is going on between transcriber 300 and slot machine 200, with the other channel 410 being on standby.

Preferably, however, after transmitting the message to slot machine 200 and while waiting for the machine to calculate its response, the device can use this interval to intercalate a data transmission between central processing unit 1 and value unit transfer element 300 or even between central processing unit 1 and slot machine 200.

The invention thus provides data transfer coordination means for intercalating a secondary data transmission between main data transmissions.

Thus, main transmissions and secondary transmissions can be effected simultaneously, with the secondary transmissions being intercalated between the main transmissions.

In our example, slot machine 200 is thus informed of the value unit balance available in the gambler's chip card or receives a transfer of value units corresponding to the bet for a game.

Thus, slot machine 200 can forward information on the gambling operations it is carrying out to central computer 1 via the network.

Once the data exchange with transcriber 300 is complete, the data transfer coordination means block the standby signal in channel 410. Slot machine 200 can then request that information be transmitted to central computer 1.

Slot machine 200 can in particular signal to central unit 1 the identification of the card, its value unit balance, and the amount of the bets or winnings.

This dialog takes place through network link means 123 and adapters 120, 121, 122, 11 of a known type.

Central unit 1 can be connected by a link 123 common to all the slot machines 200, 201, 202 or by individual links with each machine.

The link means can be common to a set of slot machines 200, 201, 202, in which case a single transmission can take place at any time between one of the machines and central processing unit 1. For example, the machines can be connected to the central unit by a single link, with each machine being connected to this link, which is of the serial cable or parallel bus type. In this case, network link means 123 are connected to central unit 1 by a simple adapter that converts or relays the data transmission mode. The adapter also runs a program determining the machine sending or receiving a data transmission.

Alternatively, the network can have individual link means between each slot machine and central unit 1.

For example, the slot machines can be connected individually by a two-wire link to central unit 1. In this case, the central unit is preferably connected to network link means 123 by a central switching device according to the invention having the same number of channels as of connected machines (not shown). The central unit thus dialogues with a specific slot machine, for example machine 200, and central unit 1 and a two-wire link leading to slot machine 200 are placed in communication. The central switching device makes the connection between channel 10 of central unit 1 and one of the channels of the central device, the channels being connected individually to their respective slot machines 200, 201, or 202. The two-wire link leading to a slot machine 200 can have an adapter 120 and a switching device 400 connected to a transfer element 300 and to machine 200.

The other channels of the central switching device of central unit 1 are then placed on standby. Devices 401 and 402 connected to machines 201 and 202 then receive a standby signal over their channels 411 and 412 connected to the central switching device.

After the dialog between slot machine 200 and central unit 1, the standby signals disappear. Central unit 1 can then dialog with another slot machine 201 or 202 of the network, if the corresponding channel 411 or 412 is no longer carrying a standby signal. Device 400 that has switching means can, for its part, recognize a new exchange of messages between machine 200 and its transcriber 300.

One particular embodiment of the data transfer switching and coordination means according to the invention will now be described in detail. Such switching means can be built into a device 400 that interconnects slot machine 200 and transcriber 300 to network 123, with the device being advantageously built into an isolated unit as shown in FIG. 2.

It will however be noted that the switching means can be built into any of the network elements, either slot machine 200, or transcriber 300, or central computer 1, or even built into the network link means 123. These switching means can also be distributed and dispersed through each element on the network.

Figure 3:
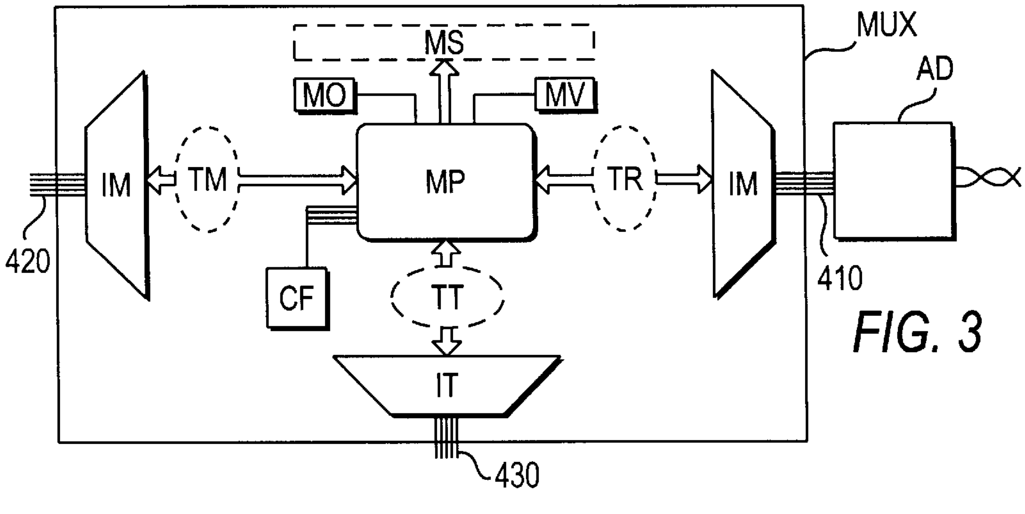
FIG. 3 is a diagram showing the data transfer device designed for such a network and including data switching and data transfer coordinating means according to the invention.

FIG. 3 illustrates one embodiment of the switching means in the form of an electronic circuit hereinafter called multiplexing circuit MUX.

"Multiplexing" herein will be understood to be the fact of transmitting data over two link channels selected from at least three channels, with the data coming from the first of the two selected channels being transmitted to the second selected channel and, conversely, the data coming from the second selected channel being transmitted to the first selected channel.

Multiplexing circuit MUX has, in this embodiment, a microprocessor MP, a program memory MO, a data memory MV, and a configuration memory CF. Program memory MO is preferably a read-only memory ROM. Data memory MV is preferably a random access memory (RAM). Configuration memory CF is preferably an electrically erasable programmable read-only memory (EEPROM).

Microprocessor MP is connected by one or more data buses to input/output interfaces.

For a switching device 400 with three channels 410, 420, and 430 as shown in FIG. 2, the corresponding multiplexing circuit MUX thus has three interfaces IR, IM, and IT.

The first interface IR is connected to network link means 123 and central processing unit 1. The second interface IM is connected to a link 420 connected to slot machine 200. The third interface IT is connected to a link 430 connected to transcriber 300 that transcribes data onto chip cards.

Microprocessor MP runs a program of instructions stored in its read-only memory MO. It stores the data in random access memory MV, whether they are intermediate data called for by the instruction program or status data such as data on transmission, standby, or start or end of message status. Also, it can store message data in random access memory MV for delayed transmission.

The microprocessor also consults configuration memory CF to transmit the data by a specific transmission protocol whose parameters are preferably stored in the erasable read-only memory CF so that they can be modified.

The data transmission protocols vary according to the slot machines, the value unit transfer elements, the central processing units, or the link means used. Hence it is preferable for their characteristics and those of the corresponding coding/decoding programs to appear in a separate read-only memory, preferably an easily reprogrammable memory of the EEPROM type.

Interfaces IR, IM, and IT format the electrical signals corresponding to the data transmitted. The interfaces can advantageously have an input buffer storing the data received from one channel when the latter is not in communication. The buffer can also maintain a constant signal at the output of this channel such as the aforementioned standby signal while the microprocessor is carrying out other instructions.

FIG. 3 shows other optional circuits in dotted lines, such as protocol translators TR, TT, and TM. These protocol translators convert the data transmitted over a channel according to a specific protocol into another downstream protocol adapted to the circuit such as microprocessor MP itself or the computer (translator TR) or the slot machine 200 (translator TM) or the transcriber (translator TT).

The protocol can also be translated by microprocessor MP if the latter can call on programs and conversion data stored for example in configuration memory CF.

A security module MS can advantageously be provided in multiplexing circuit MUX. Security module MS provides security for exchanges of information, particularly card identification data or data on the gambling value unit balances. The security module preferably has encryption algorithms or identification data and encryption data or identification keys. Various algorithms and encryption data can be used by the individual skilled in the art, and several patent applications in the name of the applicant describe such algorithms.

One example of providing security for data transfers over the network is explained hereinbelow, considering a standard data encryption algorithm of the DES algorithm type that certifies digital data exchanged between card CJ1, transcriber T, the gambling machine, and central processing unit 1. Using a DES algorithm, encryption and decryption of the certificate accompanying the transmitted data are possible and consistent only if a secret key is used.

The data encryption algorithms of the DES type have several series of complex calculations that will not be described in detail herein.

One example of implementing a DES algorithm will be given, assuming simply that the algorithm furnishes an encrypted number, called session key K', from a first given number, called identification key K, and a random number Rnd, according to the example of the formula below:

$$K'=DES(K,Rnd)$$

The complexity of the DES algorithms makes it impossible to discover a secret identification key K from session key K' and random number Rnd.

Figure 4:
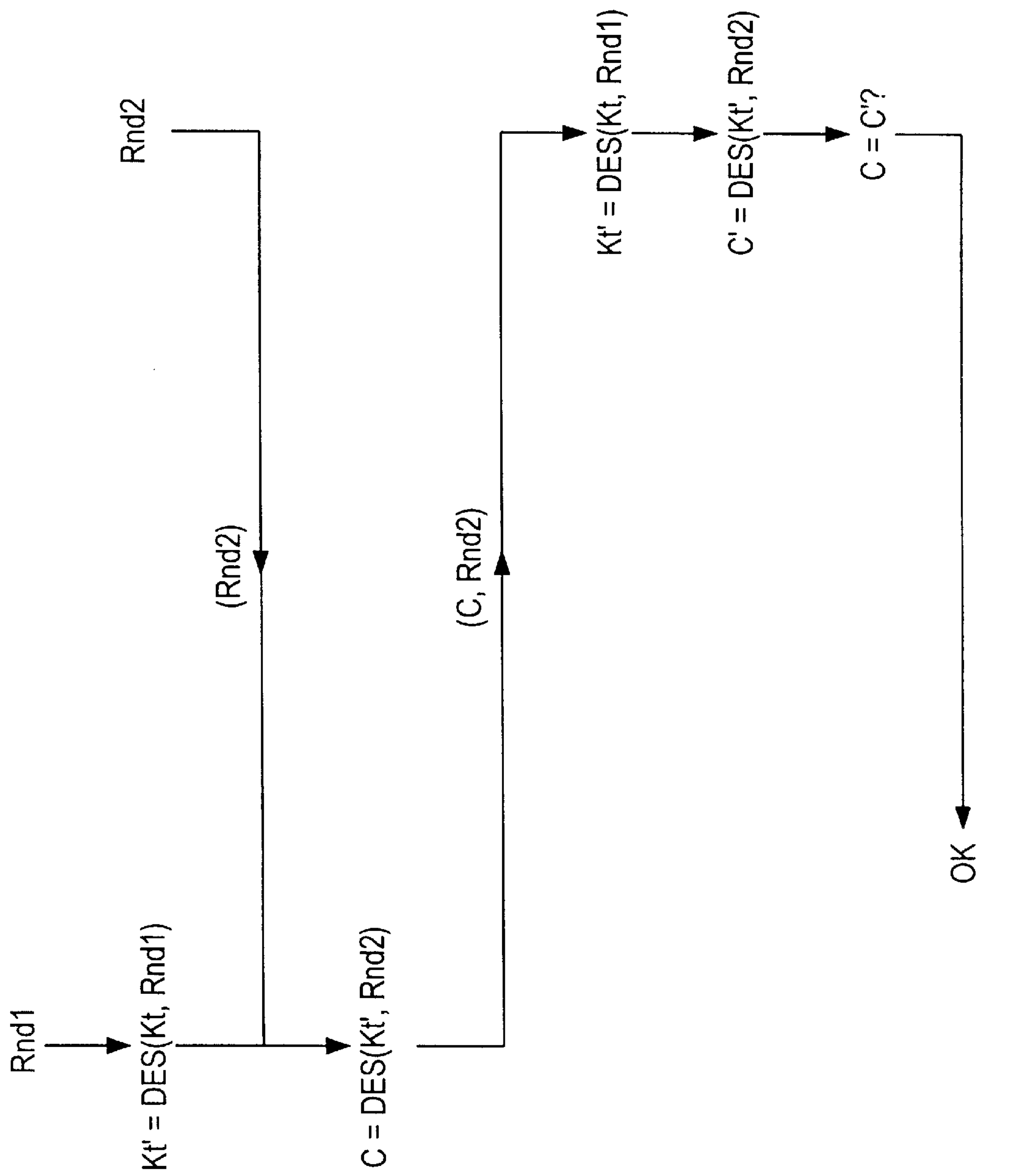
FIG. 4 is a diagram illustrating implementation of a DES algorithm.

FIG. 4 illustrates implementation of a DES algorithm. The algorithm is used to certify a message, by the sender of the message which can be a slot machine 200, a value unit transfer element 300, a chip card, or even a switching device according to the invention. The sender then has a security module MS that has, in an inaccessible memory zone, at least one secret identification key Kt. The security module of the sender generates a pseudo-random number Rnd1. From these two numbers Rnd1 and Kt, the DES algorithm used by the security module calculates a session key Kt'.

This session key Kt' can serve as an authentication certificate and be sent with random number Rnd1 and the data to be certified. However, to make it impossible to discover the keys, the DES algorithm can be applied a second time. As can be seen in FIG. 3, the sending of the message to be certified asks the recipient, central unit 1 for example, to provide it with a second random number Rnd2.

The DES algorithm is once more applied to session key Kt' and to second random number Rnd2 by the security module of the sender to calculate a certificate C.

The data message is then sent to the recipient accompanied by certificate C and random number Rnd1, both calculated by the card. Thus, the keys used, particularly secret identification key Kt and session key Kt', are not exchanged.

Authentication of the data message is effected by recalculating a certificate C' from the same data. The algorithm is hence used a second time to authenticate the message by the recipient of the message. The recipient must thus have a second security module with secret identification key Kt in its memory. The second security module can then calculate session key Kt' from identification key Kt and random number Rnd1.

The second security module still has the random number Rnd2 that it previously provided to the sender. From these two numbers, Rnd2 and Kt', the second security module once again calculates a certificate C' by applying the DES again.

By checking that the certificate C calculated by the sender corresponds to the certificate C' recalculated by its security module, the recipient can authenticate the data message received.

Note that a new session key Kt' and a new certificate C are recalculated each time the desired message is certified. This prevents a pirate machine on the network from being able to use a previous certification.

With such a security module MS, multiplexing circuit MUX can thus identify the senders sending messages thereto, particularly the chip cards read by the transcribers, and can also encrypt and decrypt the messages transmitted by each sender over the network. Multiplexing circuit MUX can also have the function of encrypting the data on the value unit balance and the value unit transfers, i.e. the amounts transferred during gambling operations.

The operation of the multiplexing circuit will be better understood from two examples of message exchanges.

Assume that the central computer is sending a message to a slot machine 200. The MUX circuits of switching devices 400, 401, and 402 receive the start of the message. The MUX circuits of devices 401 and 402 corresponding to machines 201 and 202, not involved, disconnect their respective channels 411 and 412. Slot machines 201 and 202 can however exchange messages with their value unit transfer element 301 and 302, respectively.

The MUX circuit of device 400 places channel 430 going to transfer element 300 on standby, and interface IT sends a standby signal.

The MUX circuit of device 400 translates the message, whereby microprocessor MP or translators TR and TM translate the data of a protocol into the protocol recognized by the electronics of the machine. Finally, interface IM of the MUX circuit sends or repeats this message to slot machine 200 over link channel 420.

Preferably after this first message has been transcribed, device 400 does not wait for the response from machine 200 and prepares to accept a message from any channel 410, 420, or 430 to transmit this new message while the machine is calculating its response. In this case, as soon as the first message has ended, the device cancels all standby signals in channels 410, 420, and 430.

Device 400 can also wait for the response from machine 200. When the response message returns to multiplexing circuit MUX of device 400, the circuit analyzes, translates, and repeats the message to central processing unit 1 via network link channel 123. When the message exchanges between central unit 1 and machine 200 are complete, multiplexing circuit MUX releases channel 430 connected to transfer element 300. The slot machine can then resume data and value unit exchanges with transfer element 300.

During such message exchanges, slot machines 200, 201, and 202 inform the central unit of their status. A machine 200 can for example be in a non-operating, a transmission error, or a normal state.

Advantageously, the value unit transfers can be rejected by the multiplexing circuit if the machine is in a nonoperating state. Thus, when multiplexing circuit MUX is informed that the value unit transfer element wishes to credit the slot machine, the MUX circuit scans a status indicator of the slot machine. Depending on the status of the machine, it either carries out the value unit transfer operation or does not carry it out.

Upon such a message exchange between transfer element 300 and slot machine 200, the MUX circuit of device 400 places channel 410, connected to the network, on standby.

The MUX circuit translates and repeats the value unit transfer message to slot machine 200. Machine 200 checks the encryption of the message and records the amount transferred. Multiplexing circuit MUX.waits for slot machine 200 to respond, translates the response, and sends it to transfer element 300.

Conversely, when the gambler wishes his winnings to be delivered to him, the slot machine and the transfer element exchange a value unit transfer message. The value unit transfer element 300 checks the encryption of the message and delivers the winnings. If the transfer element is a transcriber of data onto a chip card, for example, it records the new value unit balance in the card memory. After this operation, transfer element 300 sends a conventional response if the operation has taken place smoothly and multiplexing circuit MUX of device 400 transmits it to the machine.

Once the exchanges between slot machine 200 and its transcriber 300 are complete, or preferably after each message has been transmitted, the standby signal sent over channel 410 by interface IR of the multiplexing circuit MUX is canceled.

It will be noted that a variant of the switching means according to the invention can call for transmitting data directly between channel 430 of value unit transfer element 300 and channel 410 connected to central computer 1 by the network link means.

One advantage of this variant is that the computer directly receives balance data furnished by transfer element 300, or information on the gambler recorded in a chip card for example.

A device according to the invention having a multiplexing circuit MUX with translators TM and TT can advantageously be used simply to translate messages exchanged between machine 200 and its value unit transfer element 300, this slot machine/transfer element 200, 300 not necessarily being connected to a network. Device 400 then plays a simple interfacing role to translate messages according to the contemplated protocol appropriate for the recipient circuit.

The switching means according to the invention are preferably disposed in an isolated unit that can connect to the electronic links provided in existing machines. Thus, networking of slot machines already operating with a coin meter or connection to an electronic coin meter of the machines that can already be networked is possible at low cost.

Another advantage of the invention is that a network can be formed with slot machines and transcribers using different message transmission protocols.

The invention also allows data transfers to be made securely, particular transfers of value units corresponding to sums of money, by encrypting messages.

Other embodiments, advantages, and characteristics of the invention will appear to the individual skilled in the art without departing from the claims hereinbelow.

What is claimed is:

1. A slot machine system comprising:

a network of slot machines (200, 201, 202) having value unit transfer elements (300, 301, 302);

a network data transfer link (123) for said slot machines to communicate with a central processing unit (1); and devices (400, 401, 402), each device comprising:

a multichannel link including a first main channel (410) connecting to the central processing unit (1) via the network data transfer link (123), a second main channel (420) connecting to a slot machine (200) in the network, and a secondary channel (430) connecting to the value unit transfer element (300); and means for switching main data transfers via the first main channel (410) and the second main channel (420), and for switching secondary data transmissions via the second main channel (420) and the secondary channel (430).

2. A device according to claim 1, wherein the switching means comprising means for data transfers between the first main channel (410) and the secondary channel (430).

3. A device according to claim 2, wherein said switching means comprises data transfer coordinating means for analyzing a transmitted data message, recognizing a destination channel and transmitting the data message to the destination channel.

4. A device according to claim 2, further comprising means for recognizing that a slot machine (200) is in a nonoperative state and reporting the state of the machine over the first main channel (410) assigned to linking the network with the central processing unit (1) or over the secondary channel (430) assigned to the value unit transfer element (300) while preventing all data from being transferred to the machine when the machine is nonoperative.

5. A device according to claim 1, further comprising means for placing at least one channel on standby when a transmission is being made between the two other channels.

6. A device according to claim 1, further comprising means for enabling a secondary data transmission transmitted from the secondary channel to be inserted between the main data transmissions transmitted from the main channels.

7. A device according to claim 6, wherein said enabling means allows main transmissions and secondary transmissions to be made simultaneously, with the secondary data transmission being inserted between the main data transmissions.

8. A device according to claim 1, further comprising data transfer protocol translation units (TR, TM, TT) for data transfer protocol translation of data at the respective channels.

9. A device according to claim 8, further comprising an interface for translating data transfers between a slot machine (200) and the corresponding value unit transfer element (300).

10. A device according to claim 1, further comprising a security module (MS) that calculates an authentication certificate for data transmitted from secret data stored in a memory of the security module.

11. A device according to claim 10, wherein the data transmitted are accompanied by the authentication certificate calculated by the security module (MS) to authenticate the origin of the data.

12. A device according to claim 11, wherein the security module checks that the authentication certificate calculated corresponds to the authentication certificate accompanying the data to be transmitted in order to authenticate the origin of the data.

13. A device according to claim 1, wherein at least one channel (410, 420, 430) has an input buffer (IR, IM, IT) that formats and stores the transmitted data.

14. The slot machine system according to claim 1, further comprising an adapter (AD) for converting one data transmission mode into another transmission mode to adapt the one transmission mode usable on the network data transfer link (123) to the other transmission mode usable by the device.

15. The slot machine system according to claim 1, wherein the value unit transfer element (300, 301, 302) includes a transcriber transcribing data onto a chip card.

16. The slot machine system according to claim 1, wherein the value unit transfer element (300, 301, 302) includes a transcriber transcribing data onto a contactless card.

17. The slot machine system according to claim 1, wherein the value unit transfer element (300, 301, 302) includes a transcriber transcribing data onto a bank card.

18. The slot machine system according claim 1, wherein the value unit transfer element (300, 301, 302) includes a bill cashing machine.

19. A data transfer network comprising:

at least one slot machine (200) having a value unit transfer element (300);

a data transfer link (123) connecting to a central processing unit (1); and at least one device (400) comprising:

a multichannel link including a first main channel (410) connecting to the central processing unit (1) via the network data transfer link (123), a second main channel (420) connecting to the slot machine (200) and a secondary channel (430) connecting to the value unit transfer element (300); and data transfer switching and coordinating means for enabling data to be transmitted between the slot machine (200) and the value unit transfer element (300), and data to be transmitted between the slot machine (200) and the data transfer link (123).

20. The data transfer network according to claim 19, wherein the data transfer switching and coordinating means also enables data to be transmitted between the value unit transfer element (300) and the data transfer link (123).

21. The data transfer network according to claim 19 or 20, wherein the data transfer switching and coordinating means enables transmissions of the central processing unit (1) and the value unit transfer element (300) to be intercalated.

22. The data transfer network according to claim 19, wherein the data transfer switching and coordinating means also comprise means (TR, TT, TM) for translating data transfer protocols.

* * * * *